(12) United States Patent
Mammana et al.

(10) Patent No.: US 7,893,605 B2
(45) Date of Patent: Feb. 22, 2011

(54) BACK-GATED FIELD EMISSION ELECTRON SOURCE

(75) Inventors: Victor Pellegrini Mammana, Campinas-SP (BR); Gary E. McGuire, Chapel Hill, NC (US); Olga Alexander Shenderova, Raleigh, NC (US)

(73) Assignee: International Technology Center, Raleigh, NC (US)

( * ) Notice: Subject to any disclaimer, the term of this patent is extended or adjusted under 35 U.S.C. 154(b) by 420 days.

(21) Appl. No.: 11/904,938

(22) Filed: Sep. 28, 2007

(65) Prior Publication Data

US 2008/0067494 A1 Mar. 20, 2008

Related U.S. Application Data

(62) Division of application No. 10/974,895, filed on Oct. 27, 2004, now abandoned.

(60) Provisional application No. 60/516,044, filed on Oct. 31, 2003.

(51) Int. Cl.
*H01J 1/304* (2006.01)

(52) U.S. Cl. ............ 313/346 R; 257/10; 257/E29.005; 977/939

(58) Field of Classification Search ............ 257/10, 257/E29.005; 313/309–311, 346 R, 495–497; 977/939

See application file for complete search history.

(56) References Cited

U.S. PATENT DOCUMENTS 5,529,524 A * 6/1996 Jones ......................... 445/24
6,420,726 B2 7/2002 Choi et al.
6,933,664 B2 * 8/2005 Kitamura et al. ............ 313/309
2003/0160555 A1 8/2003 Filho et al.

FOREIGN PATENT DOCUMENTS

EP 1221710 A2 1/2002

OTHER PUBLICATIONS

Choi Y.S. et al., "An under-gate triode structure field emission display with carbon nanotube emitters", Diamond and Related Materials 10 (2001) p. 1705-1708.

Yu, S. et al., "Energy distribution for undergate-type triode carbon nanotube field emitters," Applied Physics Letter, vol. 80, No. 21, May 27, 2002, p. 4036-4038.

(Continued)

*Primary Examiner*—Colleen A Matthews
(74) *Attorney, Agent, or Firm*—Miller Patent Services; Jerry A. Miller

(57) ABSTRACT

A field emitter device consistent with certain embodiments has a substantially planar conductor forming a gate electrode. A conductive stripe forms a cathode on the insulating layer. An insulating layer covers at least a portion of the surface between the cathode and the gate. An anode is positioned above the cathode. An emitter structure, for example of carbon nanotubes is disposed on a surface of the cathodes closest to the anode. When an electric field is generated across the insulating layer, the cathode/emitter structure has a combination of work function and aspect ratio that causes electron emission from the emitter structure toward the anode at a field strength that is lower than that which causes emissions from other regions of the cathode. This abstract is not to be considered limiting, since other embodiments may deviate from the features described in this abstract.

24 Claims, 11 Drawing Sheets

OTHER PUBLICATIONS

Choi Y.S. et al., "A simple structure and fabrication of carbon-nanotube field emission display," Applied Surface Science 221, (2004), p. 370-374.

Mammana et al., "Reduction of the number of electrons emitted backwards in back-gated devices for field emission: a theoretical study," Applied Physics Letter, vol. 85, No. 5, Aug. 2, 2004, p. 834-836.

Mammana et al., "Field emission device with back gated structure," J.Vac.Sci. Technol. A24(4), Jul./Aug. 2004, p. 1455-1460.

Kang, et al., "Under-gate triode type field emission displays with carbon nanotube emitters," Materials Research Society Symp. Proc. vol. 621, 2000, p. R5.2.1-5.2.5.

* cited by examiner

BACK-GATED FIELD EMISSION ELECTRON SOURCE

CROSS REFERENCE TO RELATED DOCUMENTS

This application is a divisional application of U.S. patent application Ser. No. 10/974,895 filed Oct. 27, 2004 now abandoned which claims priority of U.S. provisional patent application Ser. No. 60/516,004 filed Oct. 31, 2003 to Mammana, et al. both of which are hereby incorporated herein by reference.

Part of the subject matter of this application was published by the inventors in the July/August 2004 J. Vac. Sci. Technol. A 22(4), American Vacuum Society, in a paper entitled "Field Emission Device with Back Gated Structure", which is also hereby incorporated herein by reference.

BACKGROUND

The first field emission devices (FED's) employed Spindt-type or etched emitters as the source for emitting electrons, in which a metal such as molybdenum (Mo) or a semiconductor material such as Si is used to form micro-tips (tips) on cathode electrodes. The strong electric field required to extract electrons from the micro-tips is provided by positively biased gate electrodes placed in close proximity to these emitters. However, fabrication of Spindt-type or etched emitter arrays is a complex process, requiring from 50 to 65 processing steps. Manufacturing costs of Spindt-type emitters are aggravated by the fact that very large evaporator throw distances are required for array fabrication as the substrate size becomes larger, entailing the employment of expensive vacuum equipment. Moreover, due to the fact that the emitter materials exhibit relatively high work functions, high electric fields are necessary, so ion bombardment from residual ionized gas molecules will cause tip or gate erosion. Residual gas molecules may also be adsorbed by the emitting surfaces, impairing their work function, therefore reducing the emitted currents. Such working conditions increase the risk of surface damage and unstable operation of the device. Damage to a single tip through events such as arcs may render an array inoperable by producing a short circuit.

FIG. 1a shows a sketch of a cross-section of a triode type field emission device based on tips where 1 represents the substrate that supports the tips 2, which are centered in a cavity 3, the cavity being delimited by vertical wall patterned in a dielectric 4, which receives a conducting film 5, normally referred as gate or grid. By applying a voltage between the gate 5 and the tip 2, electrons are emitted toward an anode represented by 6,7,8, where 6 is a transparent glass, 7 is a conductive coating that collects the electrons and 8 is a phosphor layer that produces light when impacted by energetic electrons. FIG. 1a also shows a dielectric spacer 9 used to avoid the collapse of the device when vacuum is formed in the region 10 between the anode structure and the emitting structure.

Carbon nanotubes have attracted considerable attention as a promising material for electron emitter devices because of their ability to expel electrons when a very small negative potential is applied to it with respect to an anode. Since 1995, many experimental results have been published on field emission for multi-walled nanotubes, as well as for single-walled nanotubes.

Carbon nanotubes possess several properties favorable for field emitters: they have a sharp tip and a large aspect ratio (greater than 100), good electrical conductivity, high chemical stability and high mechanical strength, so that they are receiving much attention of research institutions that wish to employ them as the electron emission sources for field emission devices. Besides the fact that the nanotube work-function is relatively high (close to 5 eV), the large aspect ratio of carbon nanotube geometry implies high electrostatic field enhancement factors at its tip, leading to improved field emission performance, and because of that, from a application point of view, this material is often referred as having low-effective-work-function. The manufacture of diode structure field emission devices using carbon nanotubes is a straightforward process.

Although diode structure field emission devices based on carbon nanotubes have been successfully fabricated, emitted current control is not easy in such structures, because it demands high anode voltage switching.

Control is improved by using a triode structure, in which control elements are placed closer to the emitter structure, thereby reducing the voltage needed to achieve on-and-off switching of electrons emission. One such triode field emission device is shown in cross-section in FIG. 1b, reproduced from European patent application EP 1221710 A2 (Chung et al.). The glass substrate represented by 11 receives a contact layer 12, and a myriad of cavities are formed in a way that each cavity presents horizontal 13 and vertical dimensions 14 substantially larger than the dimensions of the tip cavity 3, the walls of the larger cavity (13 and 14) being patterned in a thick film insulation layer 15, in which a top an independent set of control gate electrode layers 17 are formed and insulated from each other by 16. Emitter elements 18 of carbon nanotube paste dots are placed a top the contact layer 12. Again, an anode structure 19 is provided and vacuum is formed in the region 20 between 19 and the emitting structure.

A significant problem inherent to this structure lies in the complexity of the manufacturing process, which requires a large number of processing steps. Moreover, because the gate is positioned between the anode and the cathode, some of the electrons emitted by the cathode are collected by the control gate, reducing the efficiency of the device as a source of electrons. In addition, the exposure of the gate increases the probability of catastrophic failure due to discharge between electrodes.

To avoid these drawbacks a distinct arrangement of the triode elements has been proposed, in which the control electrodes are placed under the cathode, being separated from the latter by a dielectric layer. One example of this so-called under-gate triode structure is described in the paper "An under-gate triode structure field emission display with carbon nanotube emitters", Choy et al., *Diamond and Related Materials* 10 (2001) 1705-1708 or in the U.S. Pat. No. 6,420,726 B2. FIG. 2 shows the schematic diagram of the electron emitting section of this structure, which has a glass substrate 21 with the gate electrodes 22 juxtaposed on the upper surface of this substrate, forming a plurality of parallel strips. An insulating layer 23 (e.g., polyimide) overlays the gate electrodes, with the cathode electrodes 24 plated over the layer, crossing the gate electrodes. A paste of single-walled carbon nanotubes is screen-printed onto the cathode electrodes. Following heat treatment, a surface rubbing treatment causes the carbon nanotubes 25 to protrude from the surface. Tests made with an anode plate (not shown) positioned at a distance from the emitter assembly showed that triode mode emission occurred with a gate bias of +80 V.

FIG. 3 displays a cross-section of the emitter assembly described in the above mentioned paper, with triode mode electron emission brought about by a +80 volts gate bias. The emitted electron paths are shown in dashed lines, with equipotential field lines in continuous lines. It should be noted that the electron emission, illustrated by lines 26, is primarily from the edge of the cathode 24, which is undesirable.

Among the limitations associated with this device is the fact that the polyimide insulating layer, like most organic materials, has a tendency toward outgassing. The use of an inorganic dielectric layer, on the other hand, increases processing complexity. Moreover, the fabrication of this layer adds steps to the manufacturing process. Furthermore, as shown in FIG. 3, the efficiency of this arrangement is seriously curtailed by the fact that electron emission occurs only along the cathode edges, due to the electric field screening over the greater part of the cathode. Such current concentration places a limit to the total intensity of current that can be drawn without excess heating of the emitter material. Besides, the capacitance between the cathodes and the gate electrodes restricts the frequency response of the device. In addition, although another motivation for Choy et al. seems to be the reduction of the gate current, in fact, this structure ends up showing undesired dielectric charging, due to backward emitted electrons 27 as shown in FIG. 3, since the cathode geometry does not optimize the focusing of electrons toward the anode, as indicated by the authors themselves in Choy et al., "*A simple structure and fabrication of carbon-nanotube field emission display*", (Applied Surface Science 221 (2004) 370-374). After a certain operation time, this dielectric charging results in field screening due to spatial charge, which hinders the control of emitted current by the selection of the gate voltage.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1A:
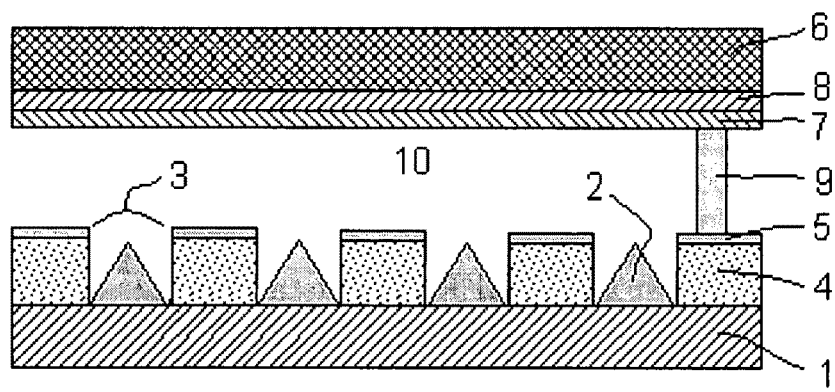
FIG. 1, which is made up of FIG. 1*a* and FIG. 1*b*, is cross-section view schematically illustrating the structure of a triode field emission device.
Figure 1B:
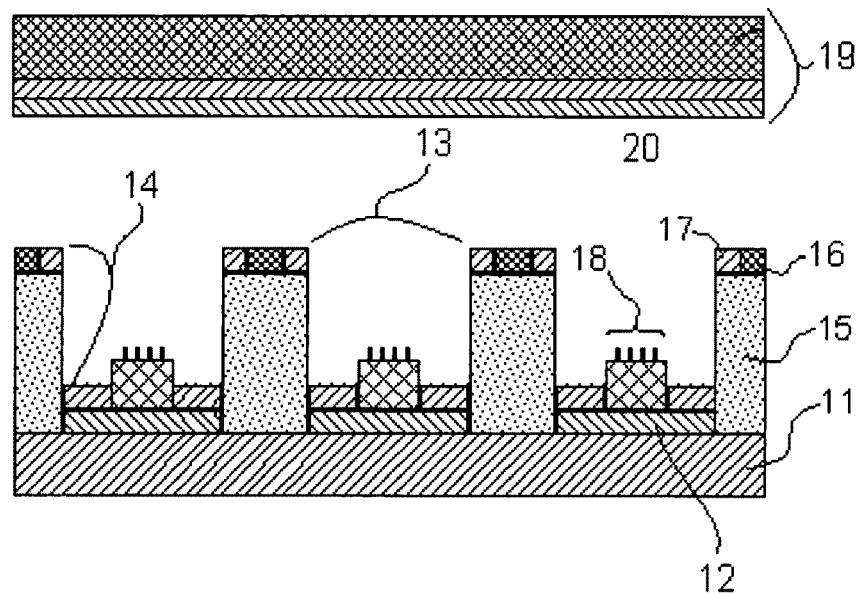
Figure 2:
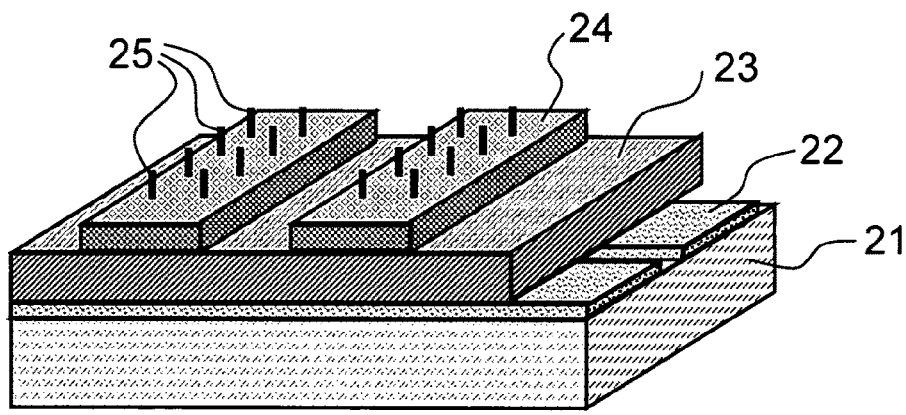
FIG. 2 is a perspective view schematically illustrating the structure of a under-gate electron-emitting assembly of a triode emission device.
Figure 3:
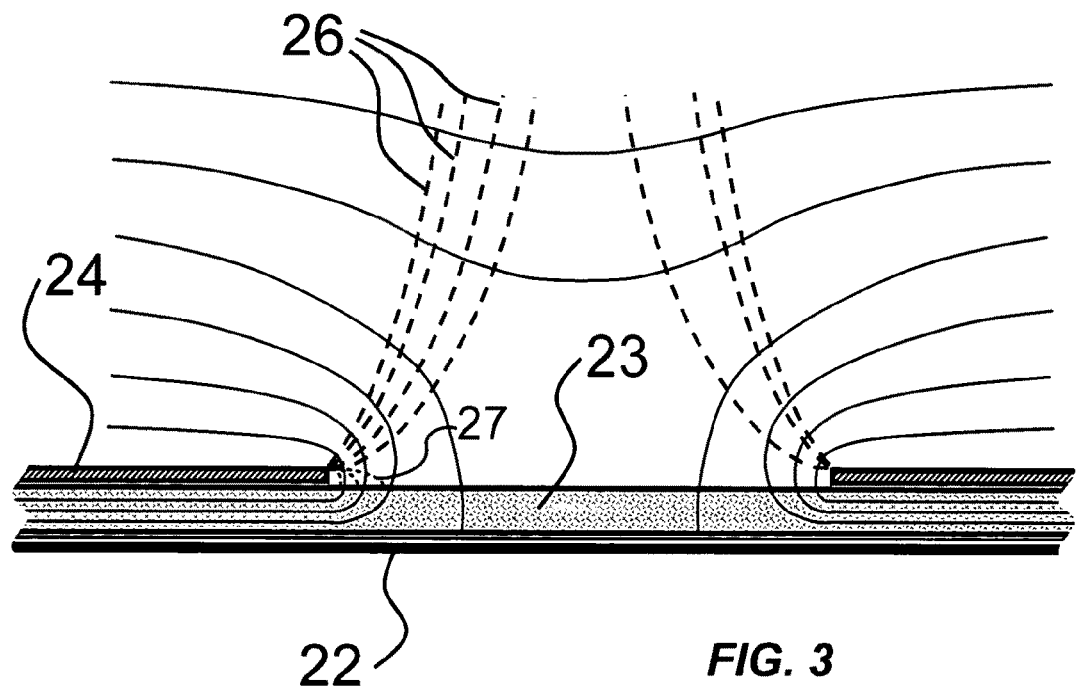
FIG. 3 is a cross-section view of the assembly depicted in the FIG. 2, illustrating the simulated equipotential line distribution and the paths of the emitted electrons with a bias voltage applied to the gate electrodes. Some electrons can be directed toward the gate, instead of being directed toward the anode, which causes dielectric charging.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Without limitation, the present invention, in accordance with certain embodiments thereof, relates to field emission devices. Certain embodiments are more particularly related, to field emission devices having a surface electron source having low effective-work-function material and an electrode structure of improved robustness featuring low power consumption due to lower gate voltage and capacitance, as well as a simplified fabrication technique, suitable for providing electron sources for employment in applications requiring low and high currents, such as, for example, Hall Effect thrusters or traveling-wave tubes, as well as other applications. However, the present invention should not be constrained to devices meeting each of these criteria.

In accordance with certain exemplary embodiments consistent with the present invention, an electron emitter assembly arrangement can be provided in which there is a more efficient use of the available cathode area. In certain embodiments, gate current can be avoided. In certain embodiments, the manufacturing process can be simplified by reducing the number of processing steps. In certain embodiments, outgassing problems can be avoided due to the use of inorganic insulators. In certain embodiments, the capacitance between the gates and the cathodes can also be reduced, as well as avoiding the relative process complexity usually associated with the deposition of inorganic insulators. Certain embodiments provide an electric field that is symmetric with respect to a vertical plane running along the central axis of the cathode. Certain embodiments may provide an emitter assembly arrangement in which triode-mode electron emission takes place at lower bias voltage than in the current arrangements, while the ratio of electrons reaching the anode with respect to the number of electrons reaching the dielectric is reduced. In yet other embodiments, dielectric charging can be decreased.

These improvements can be achieved in accordance with certain embodiments in which an emitter assembly arrangement has at least one gate electrode, a plurality of substantially prismatic conducting cathodes placed in a parallel relation with the gate electrode and isolated from the latter by a dielectric layer, the cathodes having an aspect ratio close to one and different effective-work-function properties on the portion facing the gate and on the portion facing away from the gate, the width and height of the cathodes being comparable, i.e., the aspect ratio of the cathodes cross-section being close to one. The cross-section is preferably substantially uniform along the length of the cathode stripes.

In accordance with certain embodiments consistent with the invention, the dielectric can be a solid dielectric layer, with the cathodes resting atop the surface of the layer. In certain embodiments, the cathodes' cross-section can be substantially trapezoidal in shape. In certain embodiments, the portion of the cathodes facing the gate can be flat. Alternatively, the portions of the cathodes facing toward the gate can be substantially cylindrical in shape. Alternatively, the cathodes can be substantially cylindrical in shape. Alternatively, the cathodes can be inserted in trenches engraved in the dielectric surface. Alternatively, the dielectric surface conformably overlays the gate surface, in a way that its cross-section presents trenches that are similar in shape to ones previously engraved in the gate. Alternatively, the cathodes can be substantially half-round in shape.

According to another feature of certain exemplary embodiments, the portion of the cathodes facing away from the gate can be coated with a stripe of low-effective-work-function material. Preferably, the gate electrode is made of a material that can form a stable oxide, such as silicon or aluminum (for example) and the dielectric layer between the cathodes and the gate being provided by the oxidation of the gate material. Many variations will occur to those skilled in the art upon consideration of the present teachings.

Figure 4:
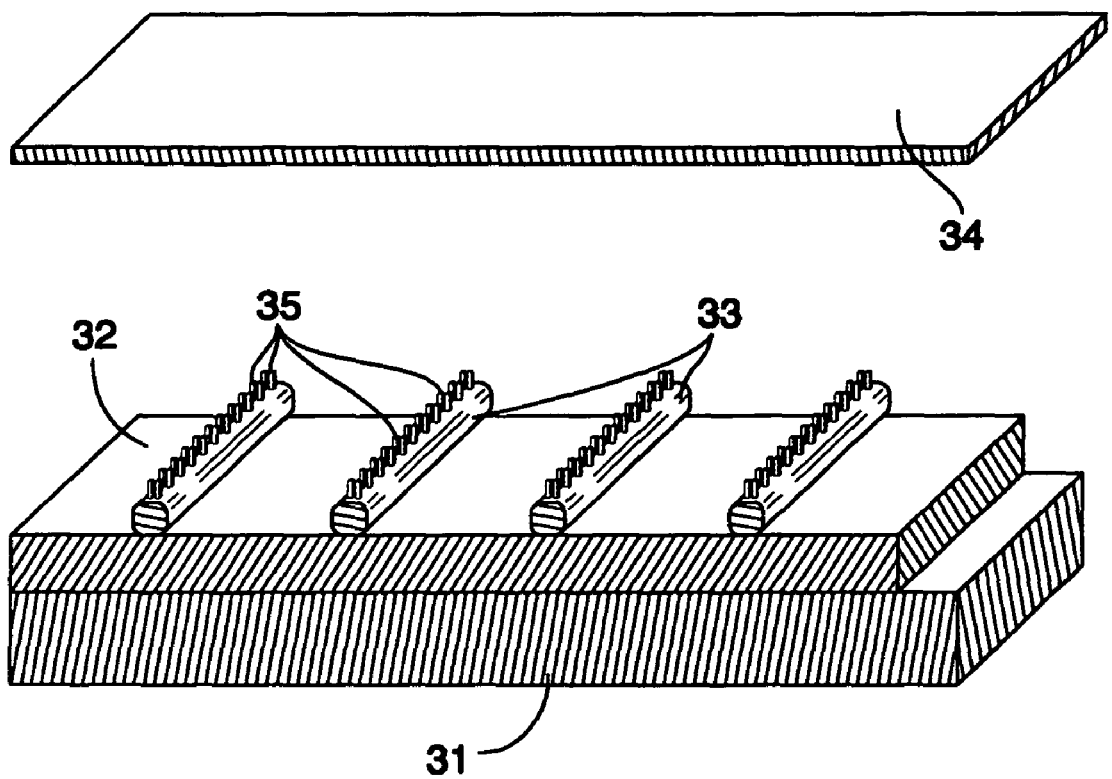
FIG. 4 is a perspective view schematically illustrating an exemplary first embodiment consistent with the invention.

As shown in FIG. 4, a triode field emission device array according to certain embodiments consistent with the present invention includes an anode 34 and a field emission assembly. The field emission assembly has a gate 31 which incorporates a conducting plate, the surface of which is overlaid by an electric insulating layer 32 (a dielectric layer). An array of parallel cathodes is arranged atop this dielectric layer 32, each cathode having a conductive (e.g., metal) stripe 33 which has a substantially uniform cross-section along its length, with a fillet of low effective-work-function material 35 overlaying the crest (i.e. the portion facing away from the gate and toward the anode) of the cathode.

The low effective-work-function material can encompass any material which is smooth, rough or bristly, homogeneous or heterogeneous, amorphous or crystalline, whose Fowler-Nordheim curves provide slopes compatible with apparent work functions substantially smaller than 5 eV (for example, approximately 3 eV or less). Examples of materials with low actual work function are MoC, WC, TiC, $LaB_6$, ZrC, NbC, HfC to mention a few. While the term "work-function" is well defined in the art, the term "effective work-function" is often less precisely defined. In the context of this document, the effective work-function is a function of both actual work function, morphology of nanostructures and geometry, so that a structure having a geometry that causes a higher work function material to behave as if it is a lower work function material can be considered to have a lower effective work function. Low actual work-function materials, can also be considered to be low effective-work-function materials. Similar, nanostructured carbon or nanostructured diamond-like carbon, can have combination of $sp^2$- and $sp^3$-nanostructural features that can provide material with lower threshold field due to combination of several factors, including but not limited to the geometrical factors, electron supply through $sp^2$-conducting channels and negative or low electron affinity of diamond-like nanostructures. Emitter devices that are historically used, such as Si and Mo, have work functions of approximately 4-5 eV. Carbon nanotubes have actual work functions of approximately 4.5 eV (work function of bulk graphite), but because of their extremely large ratio of height to width (50 to 100 or more), based on the analysis Fowler-Nordheim curves they behave as if they have a low work function, and can thus be considered to be a low effective work function material. Another example includes carbon nanotubes coated with dielectrics (MgO) where improved field emission is due to secondary electron field emission. Low work-function materials, for purposes of this document are considered to be materials with work-functions (actual or effective) below about 3-4 eV. Materials that may be considered to have a low effective work function include, but are not limited to carbon nanotubes, coated carbon nanotubes (by metals or insulators such as MgO, for example), boron nitride nanotubes, silicon nanotubes, silicon carbide nanorods, diamond nanorods, carbon nanoflakes, carbon nanosheets and other porous interconnected grapheene morphologies, porous conducting nanostructures, nanostructured diamond-like carbon, carbon or metal (Au, Ag, Ni and others) nanowires, composites of polymer matrix with incorporated nanostructures (nanoparticles or 1-dimensional nanostructures), hybrid structures, for example, of carbon nanotubes and nanodiamond or metal particles. The nanostructures can be also purposely doped (for example, B or N-doped diamond nanorods). Another example of effective low-work function material that can be implemented in the present invention can be a thin (up to a few hundreds of nanometers) coating formed by electrophoretic deposition of nanodiamond particles or a nanodiamond thin film grown by CVD over the cathode crest area. Thin films of other wide band-gap dielectrics grown over a crest of a cathode can be also used. One of the major mechanisms of improved field emission for a structure of a conductor coated with a thin film of a wide band-gap material can be low back contact barrier (less than 3-4 eV) for electron injection from conducting substrate to a conduction band of wide band-gap material and typically negative or low positive (less than approximately 1 eV) electron affinity of wide band-gap materials.

In an exemplary embodiment consistent with the invention, the conducting plate is made of doped silicon. The electric insulating layer is provided by oxidation of the surface of the silicon plate. In other embodiments, Aluminum could be used for the conducting plate and aluminum oxide could be used as the insulating layer. Other embodiments can also be envisioned within the scope of the present invention. The fillet is provided with a plurality of nanotubes 35 forming a crest of emitter tips facing the anode. Other effective low work-function structures could also be used. Although the nanotubes may be deposited in the form of a carbon nanotube paste, in one of the embodiments of the invention the carbon nanotubes may also be grown employing a Chemical Vapor Deposition (CVD) technique or alternative vapor deposition technique, or any other suitable deposition technique.

According to certain non-limiting exemplary embodiments, these cathode stripes can have a prismatic shape, i.e., one in which the cross-section remains substantially uniform along its length. Several cross-section shapes can be used in the cathodes, either regular or irregular, as long as the height and width dimensions are comparable, the aspect ratio of the cross-section being close to 1 (e.g., preferably less than about 2 and, generally speaking, less than 8-10) and the prism showing mirror type longitudinal symmetry along a plane that is perpendicular to the plane implicitly defined by the gate 31. The prismatic cathodes may have all longitudinal faces substantially flat, or may have their cross-section with one or more sides rounded either convexedly nor concavely with a curvature radius being commensurate with the size of the sides. In general, according to certain embodiments, the cathode structure can form a prismatic structure and presenting a cross-section profile with a shape that can be represented by a closed curve.

By defining an hypothetical straight line which is parallel to the gate, and using the term "line-gate distance" to refer to the distance between the straight line and the gate, the closed curve of certain embodiments can be characterized by the fact that there is an open range of line-gate distances (as defined in Mathematical Analysis), the open range being limited by lower and upper extreme points which are not part of the range. The open range of line-gate distances in certain embodiments can be characterized as follows (although other arrangements may be possible within the present teachings):

(i) within the range there are neither more nor less than two intersections between the straight line and the closed curve;

(ii) within the range the distance between the intersections, which is represented by a segment of straight line parallel to the gate and perpendicular to the line-gate distance, monotonically decreases as the line-gate distance increases;

(iii) as the line-gate distance increases toward the top limit of the open range, the distance between the intersection points either vanishes or tend to a finite positive number, defining between the intersection points a region called crest; and (iv) the number of intersections between the straight line and the closed curve is zero for line-gate distances greater than the top limit of the open range of line-gate distances.

Other structures that fall within the operational constraints described herein may also be used in certain embodiments consistent with the present invention, so this set of geometric criteria should not be considered to be an exhaustive definition.

In accordance with certain non-limiting embodiments, the cathode can also be characterized by the fact that the portion around the crest, which faces away from the gate electrode (toward the anode), is overlaid with a low effective work-function material such as carbon nanoflakes or carbon nanotubes, in a way that the low effective work-function material form a stripe with substantially constant width, around the crest, this width being deliberately smaller than the width of the cathode stripe.

As stated above, the aspect ratio of the cross section should be close to 1. For certain preferred embodiments consistent with the present invention, aspect ratios that are less than about 2 can be considered to be close to 1. In fact, certain aspect ratios that are less than 1, perhaps as low as approximately ½ for certain shapes, are also quite acceptable and are considered to be close to 1 for purposes of this document. Additionally, aspect ratios that are less than about ½ (producing a needle-like structure) may also be possible when the proper geometry and material is utilized to combat undesirable effects. In other embodiments, aspect ratios less than about 8-10 can be considered close to 1. This is in contrast with known devices in which the aspect ratio is approximately 15-20 or even greater, often resulting in a failure of such structures to produce significant electron emissions in locations other than the edges. When the emissions are restricted to the edge of the cathode adjacent the dielectric, high probability exists for the electron emission to flow back toward the gate. The term aspect ratio can generally be defined as the aspect ratio (width/height) of a rectangle that encloses the cathode structure (with or without the emitter structure, since the emitter structure is generally insignificant in height compared with the cathode metal). The term "aspect ratio" will be illustrated and explained in greater detail later.

By reference to the cross-section of the cathode, it is noted that in this example the mechanical momentum provided to an electron expelled from the crest of the cathode and close to the cathode surface should point toward the anode, in a way that after an initial acceleration toward the anode is provided, any change in the field direction toward the gate will not be sufficient to change the electron trajectory toward the gate. This is, generally speaking, a desirable condition, and under ideal circumstances, no electrons would travel toward the gate. Certain embodiments consistent with the present invention are capable of approaching this ideal, perhaps emitting no more than about 1% or less of the emission toward the gate. In order to attempt to approach or guarantee such condition, the region that is coated with the low effective-work-function material should preferably be restricted to an area at or near the crest of the cathode (closest to the anode structure). Additionally, the cross-sectional aspect ratio of the cathode is kept below approximately 10 (preferably below 2, and most preferably approximately 1), and the overall geometry of the cathode and emitter structure should preferably result in the cathode emitter structure having a low effective work-function.

Thus, in accordance with certain embodiments consistent with the present invention, a field emitter device has a substantially planar conducting material forming a gate electrode layer having a first surface. A conductive stripe forms a cathode on the insulating layer, the conductive stripe having a cross-sectional maximum width W parallel with the gate and a cross-sectional maximum height H, with an aspect ratio defined by W/H. An electric insulating layer covers at least a portion of the first surface between the cathode and the gate electrode. At least one conductive anode is positioned above the cathode to collect electrons. An emitter structure is disposed on a surface of the cathodes closest to the anode to form a cathode/emitter structure. When an electric field is generated across the insulating layer, the cathode/emitter structure has a combination of work function and aspect ratio that causes electron emission from the emitter structure toward the anode at a field strength that is lower than that which causes emissions from other regions of the cathode. Substantially all electron emissions occur between the emitter structure and the anode, and substantially no electron emissions occur from the cathode toward the gate.

Another field emitter device has a substantially planar conducting material forming a gate electrode. An electric insulating layer is juxtaposed to the gate electrode. A plurality of parallel conductive stripes form cathodes, with the insulating layer being between the gate and the anode. The cathodes are positioned in a substantially parallel relation with the gate electrode, the cathodes each having a cross-section taken normal to the length, wherein a cross-sectional width, divided by a cross-sectional height of the cathodes is less than approximately 10, the cross-section being substantially uniform along the length of the cathode stripes. At least one conductive anode is positioned above and in a parallel relation to the cathode stripes, where the electrons are collected. The anode has its width approximately the same or larger than the width of the cathode stripes. A strip of low effective work-function material is disposed along a crest of the cathodes facing the anode.

Figure 5:
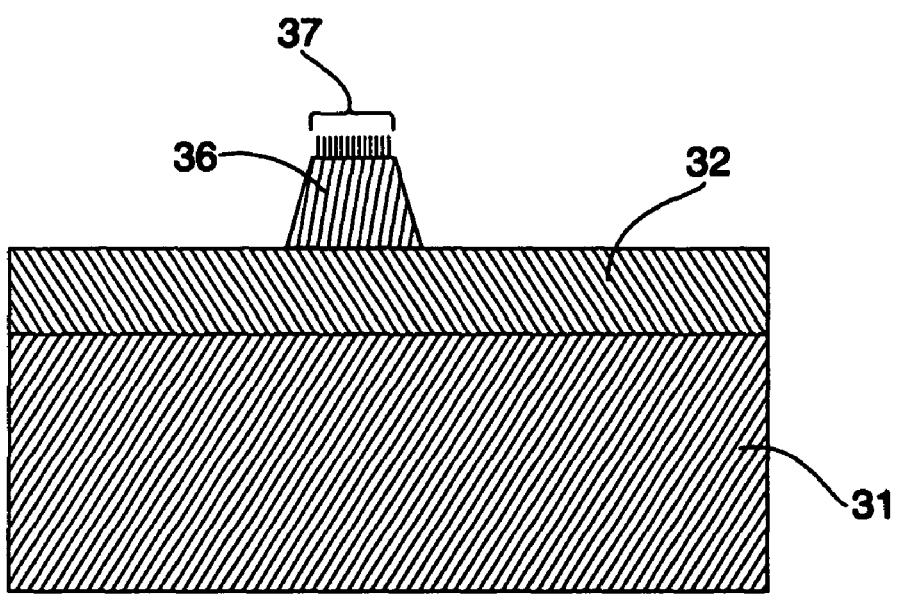
FIG. 5 is a cross-section view illustrating a first preferred shape for the cathode cross-section according to certain embodiments consistent with the invention.

FIGS. 5-8 show non-limiting examples of cross-section shapes that can be used in the cathodes, in order to achieve low current of electrons back toward the gate, and achieve a low effective work-function. Many other shapes are also possible. FIG. 5 shows a cathode 36 juxtaposed on the dielectric layer 32, having a substantially trapezoidal cross-section (with rounded corners in this example) with its upper side covered with nanotubes 37 or other suitable electron emitters.

Figure 6:
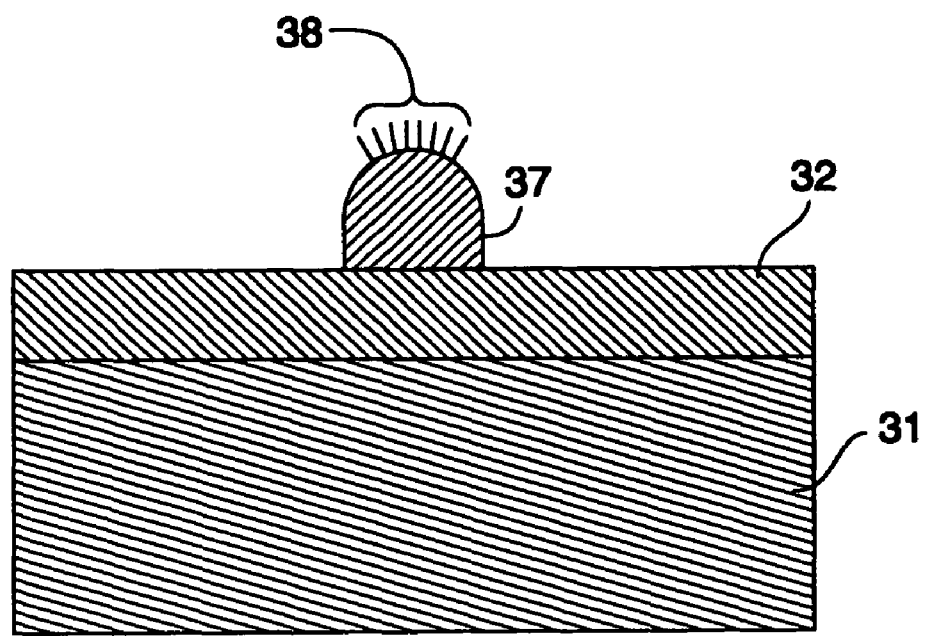
FIG. 6 is a cross-section view of a second preferred cathode shape according to certain embodiments consistent with the invention.

In FIG. 6, the cathode cross-section 37 has a substantially semi-circular shape, with the nanotubes 38 lying on its upper surface.

Figure 7:
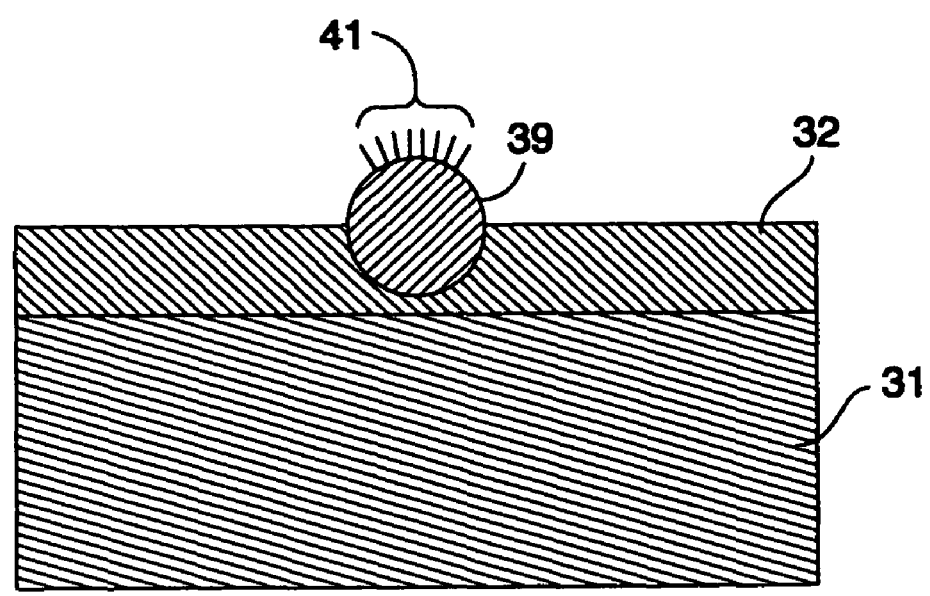
FIG. 7 is a cross-section of a third preferred embodiment consistent with the invention.

The cathode cross-section 39 shown in FIG. 7 has a substantially circular shape, with the nanotubes 41 lying along its crest, and is partially inlaid in a trench engraved on surface of the dielectric layer 32.

Many other cathode arrangements are also possible. When the cathode and emitters are positioned above a metalized cathode on the surface of layer 32, the better emission patterns are generally achieved when the cross section of the cathode metal rises to an apex or crest above the dielectric layer, with the apex having a smaller dimension than the base of the cathode geometry. Additionally, sharp edged transitions with the dielectric layer are also best avoided where possible. The particular shape can vary substantially using any variety of lines or curved profiles that lead from the apex to the surface of the dielectric layer 32. The aspect ratio of this cross section is considered to be measured as the aspect ratio of a rectangle that fully encloses the cathode's cross-sectional shape, as will be discussed. It is noted that these guidelines are not to be considered absolutely rigid, since manufacturability should also be factored into any practical design.

Figure 8:
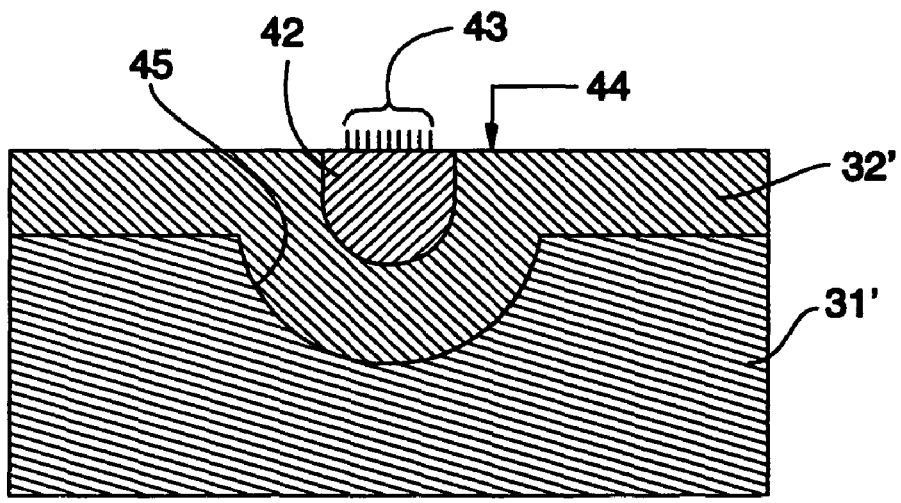
FIG. 8 depicts a cross-section of a further exemplary embodiment consistent with the invention.

FIG. 8 shows another exemplary embodiment in which a double-trench arrangement is used. In this embodiment, the dielectric 32' is provided with a folded region which occupies a larger trench 45 engraved or otherwise provided in the gate material 31'. The cathode 42 of this example has a substantially semi-circular shape which is wholly inserted within the inner trench. Its upper surface, which is overlaid with nanotubes 43, lies substantially in the same plane 44 of the dielectric layer outer face. This cathode structure features a higher electric field at the region where the low effective-work-function material is positioned and provides good focusing of the emitted electrons.

Figure 9:
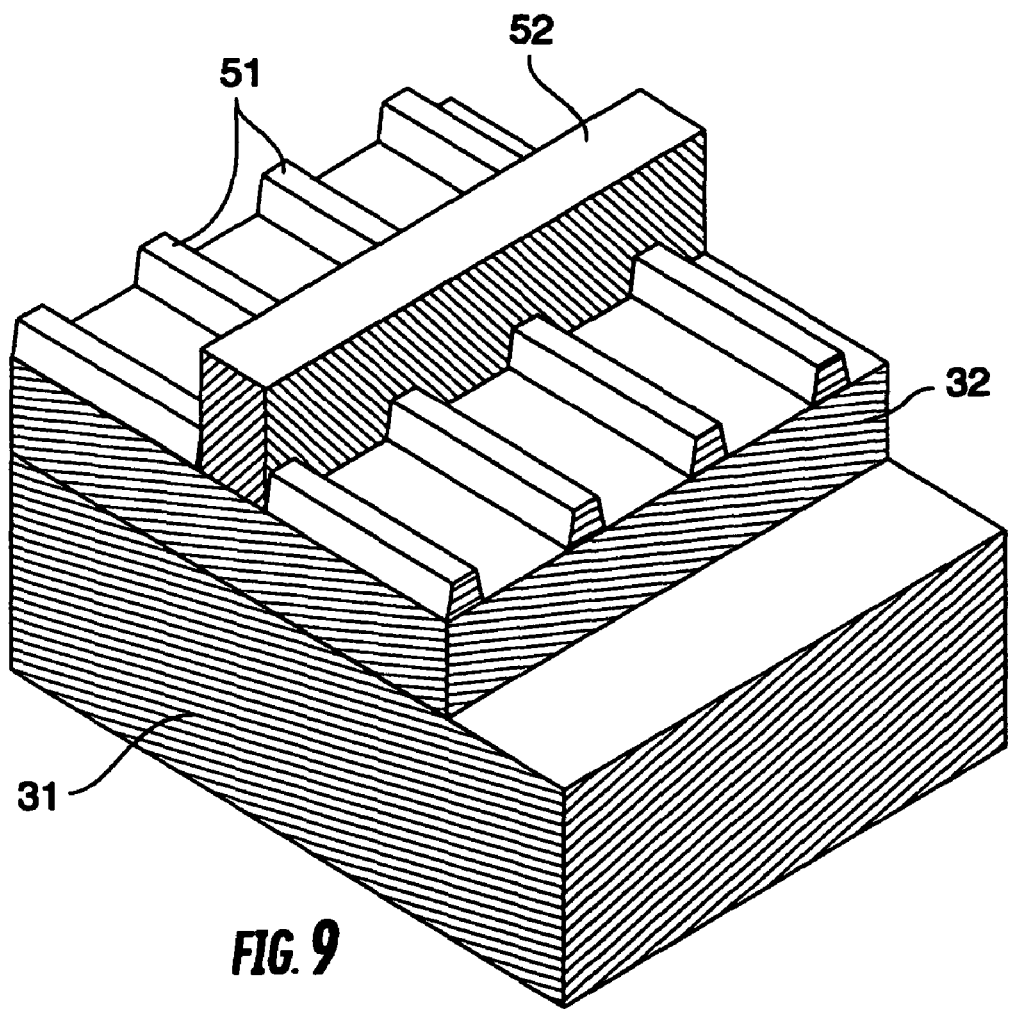
FIG. 9 shows an exemplary embodiment consistent with the invention having a fish-bone array of cathodes fed by a central conductor.

Due to the limited cross-section cathode area, the electron emission uniformity may be impaired by the voltage drop along the cathode length. To circumvent this problem, a fishbone arrangement may be employed, such as shown in schematic form in FIG. 9. In this drawing, the cathodes 51 stem from a main conductor 52 which has a comparatively large cross-section, so that the cathodes are fed with substantially equal voltages. It should be understood that this arrangement is not limited to the trapezoidal cross-section cathodes shown in the drawing, and can be used with cathodes having any other cross-sections, such as the ones depicted in FIGS. 6-8 and others, but is not limited to these. A further advantage of this arrangement is the fact that the larger cross-section of the main conductor 52 facilitates the provision of a contact to an external power supply ground.

Figure 10A:
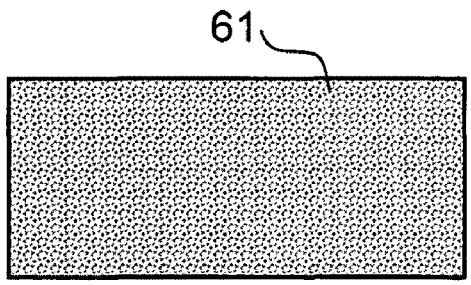
FIG. 10, which is made up of FIGS. 10*a*, 10 *b*, 10*c*, 10*d*, 10*e*, 10*f* and 10*g*, illustrates one manufacturing process flow for the creation of the trapezoidal cross-section cathodes according to certain embodiments consistent with the invention.
Figure 10B:
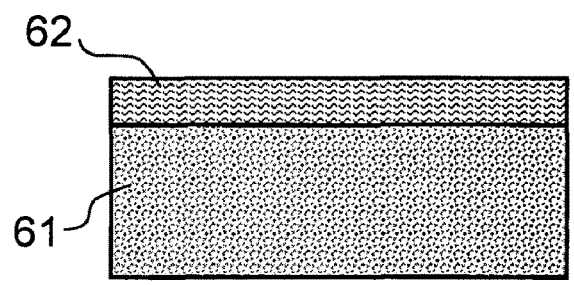
Figure 10C:
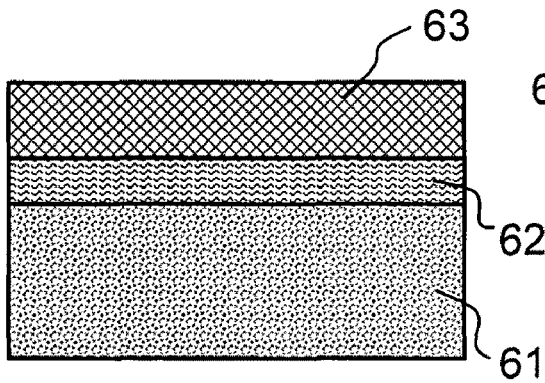
Figure 10D:
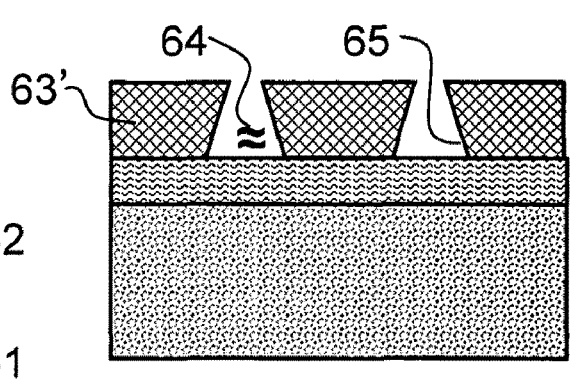
Figure 10E:
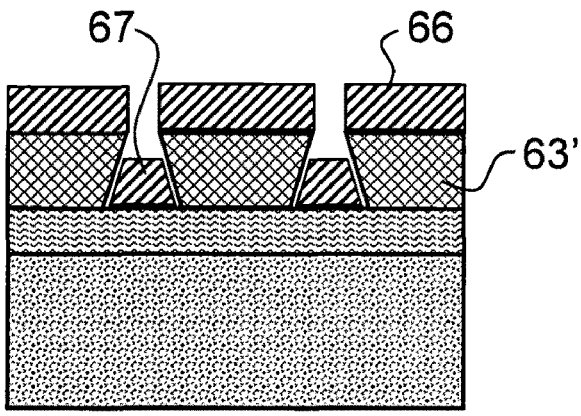
Figure 10F:
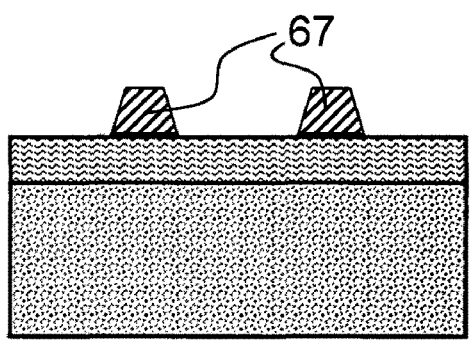
Figure 10G:
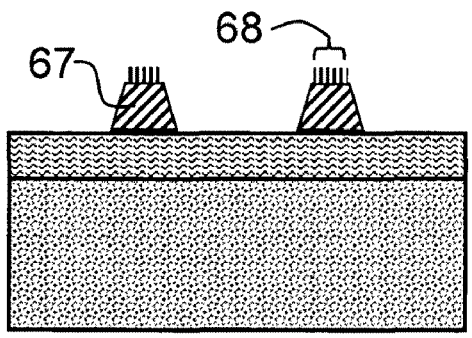

In accordance with certain embodiments consistent with the present invention, a further advantage may often be achieved in the device manufacturing process. In accordance with certain embodiments, the manufacturing process may be significantly simplified over the previous techniques. Some of the steps of an example process flow are shown in schematic form in FIG. 10. This process begins with a wafer of silicon 61, shown in FIG. 10a which is oxidized to form a dielectric layer 62 as depicted in FIG. 10b. This layer 62 is further coated with resist 63 (e.g., a photoresist) by any process as shown in FIG. 10c. Next, channels 64 are patterned in the resist 63'; as shown in FIG. 10d, this patterning operation is performed in any way that results in some undercutting 65 of the resist layer, producing channels that are preferably wider at the bottom. When the metal layer 66 is deposited over the patterned resist 63' by any process that does not coat the vertical walls, the cathode stripes 67 that are formed at the bottom of the channels have a substantially trapezoidal cross-section, as shown in FIG. 10e. As depicted in FIG. 10f, the removal of the upper metallic layer as well as of the resist leaves the trapezoidal cathode stripes 67 atop the dielectric layer in a process that is known as lift-off. FIG. 10g illustrates a final processing action of overlaying the top face of the cathode with low effective-work-function material 68 such as carbon nanotubes. As pointed out previously, this material may be carbon nanotubes grown in situ (for example using chemical vapor deposition (CVD)), a nanotube composition such as a paste containing nanotubes and a binder, or any other substance having the desired properties.

Thus, a field emitter device fabrication process consistent with certain embodiments involves providing a conducting material plate gate electrode; providing a dielectric layer over the surface of the gate electrode; coating the dielectric layer with photo-resist; patterning the resist with a plurality of channels, the bottom of the channels exposing the surface of the dielectric layer; depositing a conducting layer covering the patterned resist surface as well as the exposed surface of the dielectric layer at the bottom of the channels; lifting-off the resist leaving the conductive stripes deposited on the dielectric layer surface forming the cathodes; and overlaying the crest of the cathodes with a low effective-work-function material.

In certain embodiments, the conducting material comprises a material that presents a stable oxide and the dielectric layer is provided by oxidizing a surface of the conducting material that can form a stable oxide. For example, the conducting material can be a doped silicon wafer and the dielectric layer can be provided by thermally oxidizing the surface of the wafer. The conducting material can also be an Aluminum plate and the dielectric layer can be provided by growing a layer of Aluminum oxide by anodizing. In certain other embodiments, the dielectric layer is provided by depositing a stable oxide. Other embodiments can further involve depositing a catalyst layer over the conducting layer and growing a layer of carbon nanotubes in-situ over the catalyst layer using chemical vapor deposition. The process can further involve forming a conductive diffusion barrier between the catalyst and the cathode surface. Another embodiment can involve the electrophoretic deposition of nanomaterials such as nanotubes or nanodiamond such that the electrostatic field lines result in nanomaterial deposition on the cathode or alternatively a lift-off process involving photoresist is used to restrict the deposition of the nanomaterial to the crest of the cathode and any excess nanomaterial is removed during the lift-off step.

In certain embodiments, a field emitter device fabrication process involves providing a conducting material plate gate electrode; producing a plurality of trenches in a surface of the plate with a plurality of trenches; providing a dielectric layer over the surface of the plate; providing conducting cathodes at least partly inlaid within the trenches; and overlaying a crest of the cathodes with a low effective-work-function material. The low effective-work-function material can be carbon nanotubes.

In certain embodiments, a field emitter device fabrication process involves providing an insulating substrate; producing a plurality of trenches in a surface of the insulating substrate; providing a first conducting layer overlaying the substrate and conforming with its surface, forming at least one gate electrode; providing a dielectric layer overlaying the first conducting layer and conforming with the conducting layer forming trenches substantially concentric with the trenches engraved on the surface of the substrate; providing a plurality of cathode stripes cathode stripes formed at least partly within the trenches, the width and height of the cross-section of the cathodes being comparable; and overlaying the portion of the cathodes facing away from the gate electrode (crest of the cathode) with a strip of low effective-work-function material.

Figure 11:
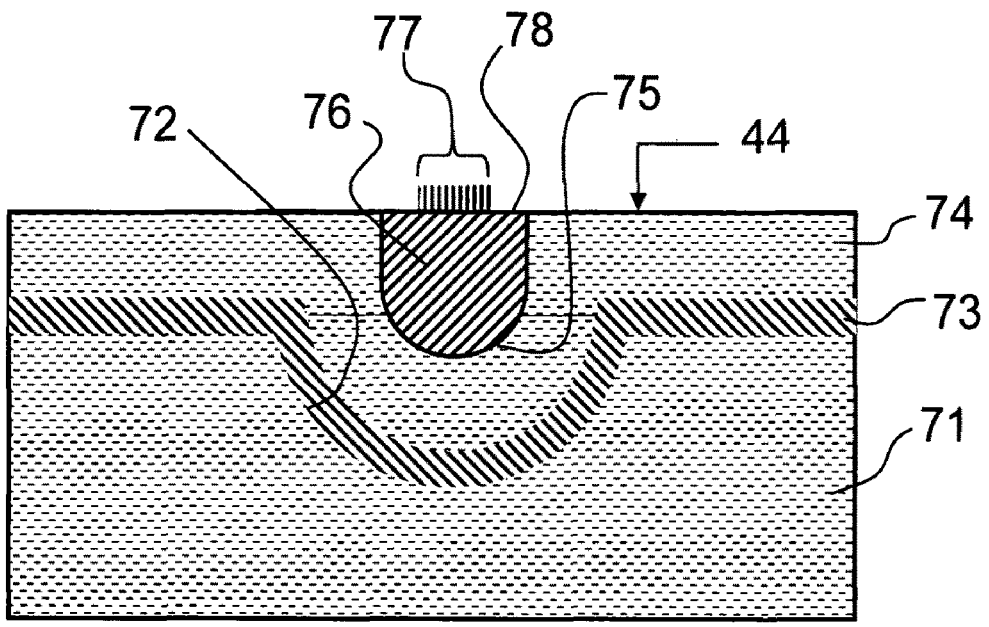
FIG. 11 shows an alternative embodiment of the arrangement shown in FIG. 8.
Figure 12:
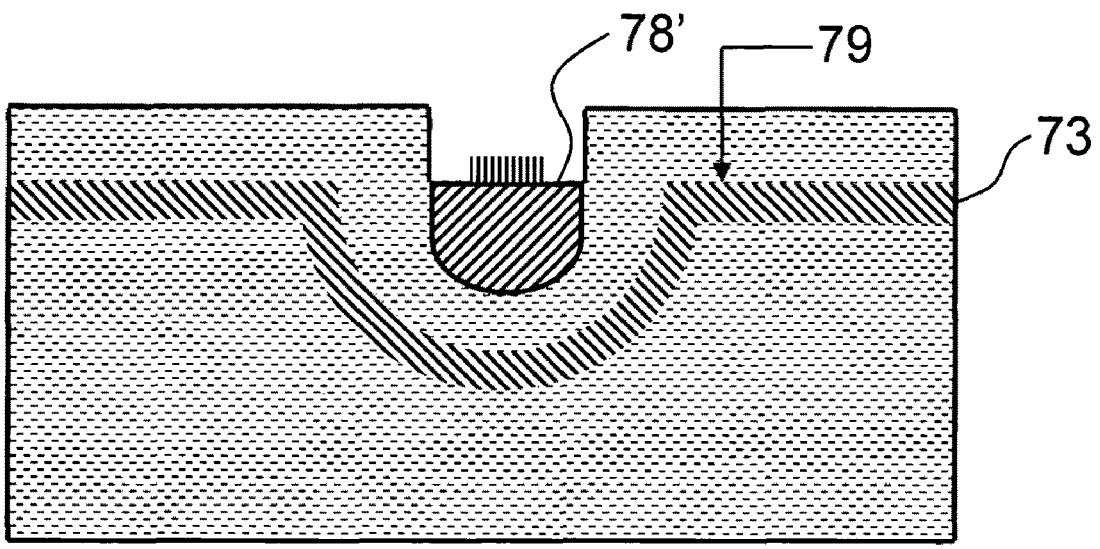
FIG. 12 shows another alternative embodiment consistent with the invention.

FIG. 11 shows an alternative embodiment of the arrangement shown in FIG. 8, in which there is provided a patterned substrate 71 of insulating material such as glass or ceramic, in whose surface at least one first trench 72 has been provided by any suitable technique. The gate is provided by conductive layer 73 overlaying the substrate 71 and conforming to its surface. A dielectric layer 74 conformal to the conductive layer 73 forms a second trench 75. The second trench is substantially concentric with the first trench. Into this second trench is formed a conducting cathode 76, whose top surface 78 is provided with a stripe of low effective-work-function material 77. The top surface 78 may be convex or flat as shown in FIG. 11, the cathode top surface being aligned with the top surface 44 of the dielectric layer, as depicted in the drawing. In a preferred embodiment, as shown in FIG. 12, the cathode top surface 78' lies below the surface 44 of the dielectric layer, being substantially aligned with the top 79 of the undergate conductive layer 73. In a further preferred embodiment, the low effective-work-function material comprises carbon nanotubes which may be applied as a paste or grown in-situ by means of CVD techniques. However, the invention is not limited to carbon nanotubes, since any other low effective-work-function material may be employed in stripe 77.

While the arrangements shown in FIG. 11 or FIG. 12 illustrate a continuous undergate 73, certain embodiments consistent with the invention allow selective addressing of individual electron emitting areas. To achieve this addressing, the conductive layer is fashioned as a plurality of gate electrodes in the form of parallel stripes arranged at an angle in relation to the cathodes. When in operation, these stripes are individually biased while the cathodes are individually connected to the power supply ground, the electron emission occurring at the selected spots placed at the crossing each selected gate electrode and each selected cathode.

Figure 13:
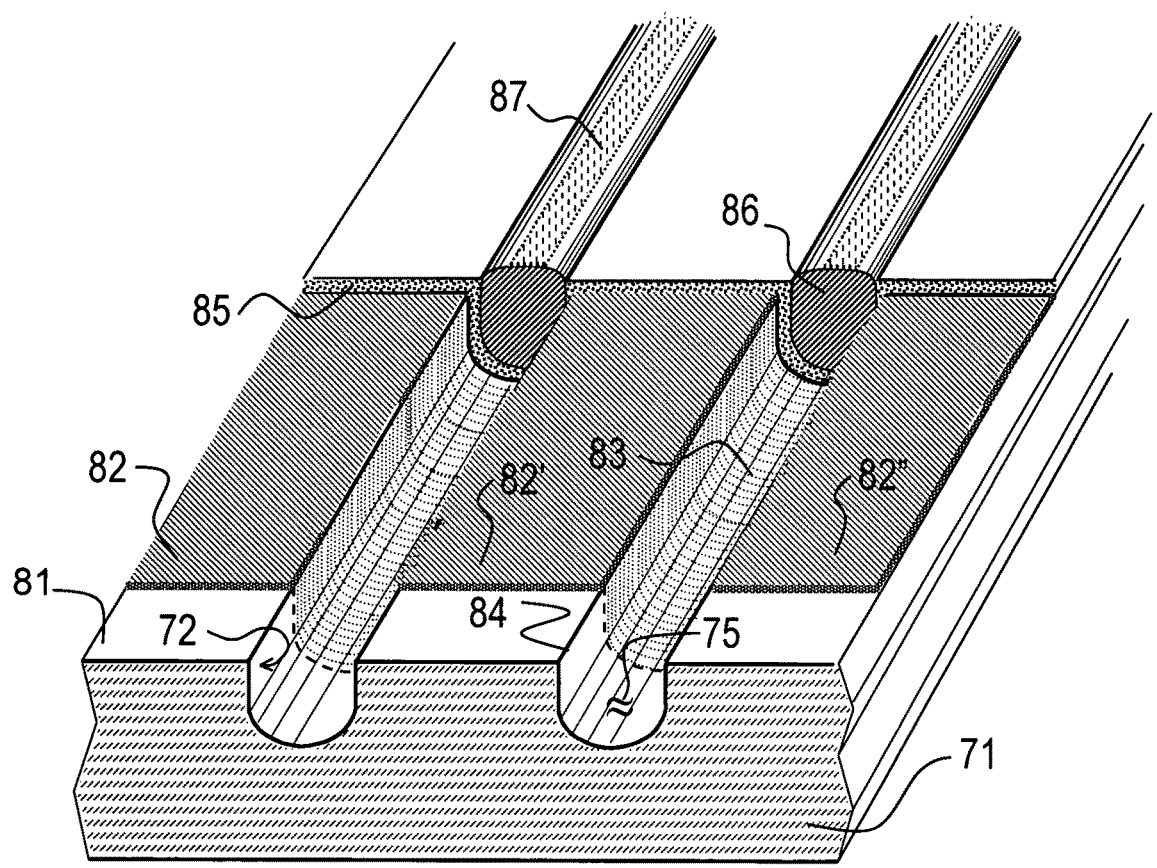
FIG. 13 shows an embodiment consistent with the invention that allows selective addressing of electron emitting areas.

To lessen the possibility of dielectric breakdown between the cathodes and the undergate, the electric field at the rear region of the cathodes can be reduced by eliminating the conductive layer from the sides and bottom of the trenches. FIG. 13 shows an arrangement which reduces the chance of such accidental dielectric breakdown. In this drawing, the insulating substrate is provided with a first plurality of trenches 75. A second plurality of conducting strips 82 is juxtaposed to the substrate's face 81, in a discontinuous pattern in which the portions 83 of the inner walls 72 of the trenches are free of the gate conducting material layer. The element 86 is the conductive cathode strip while 87 is the low effective-work-function material which coats the crest of the cathodes 86. As shown, each cathode strip 86 is separated by gate strips 82, 82', 82" that overlay only the flat portion of the face, being interrupted at the edges 84 of the trenches. Each independent gate strip 82 is buried under the dielectric 85, and can have its voltage set simultaneously to all other strips, or independently.

Figure 14:
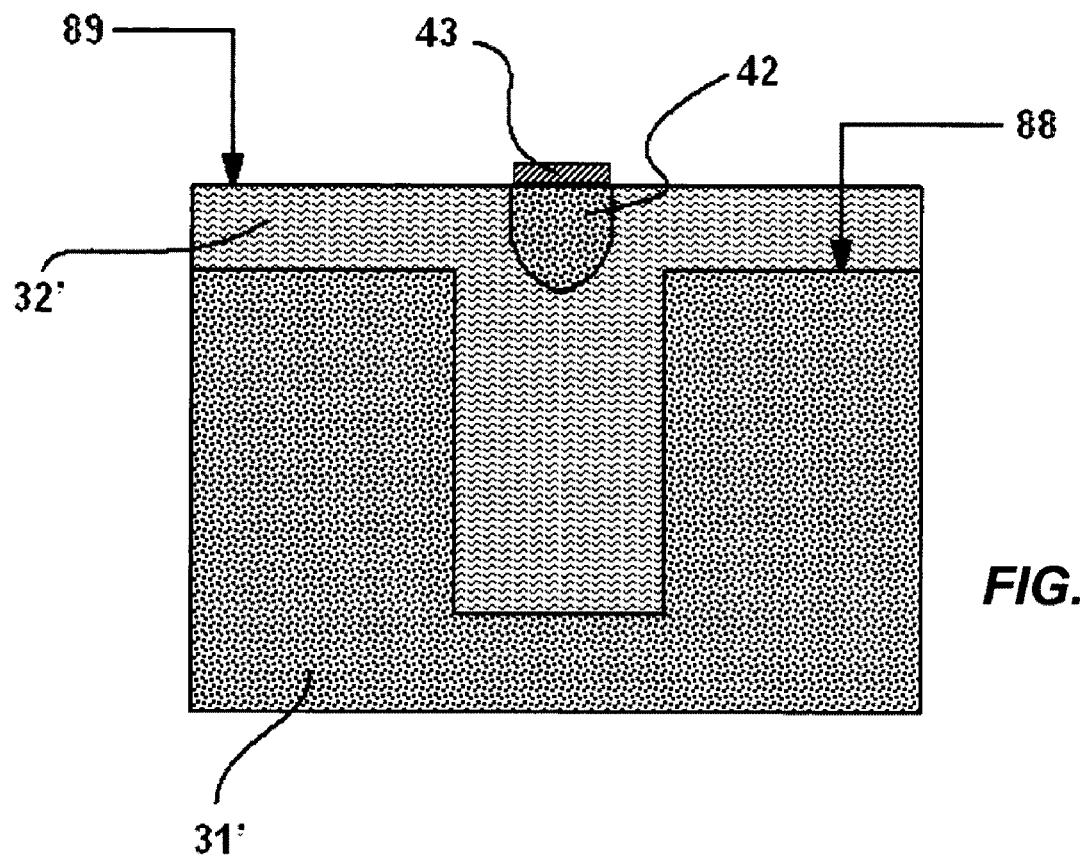
FIG. 14 shows another alternative embodiment of the arrangement shown in FIG. 8.
Figure 15:
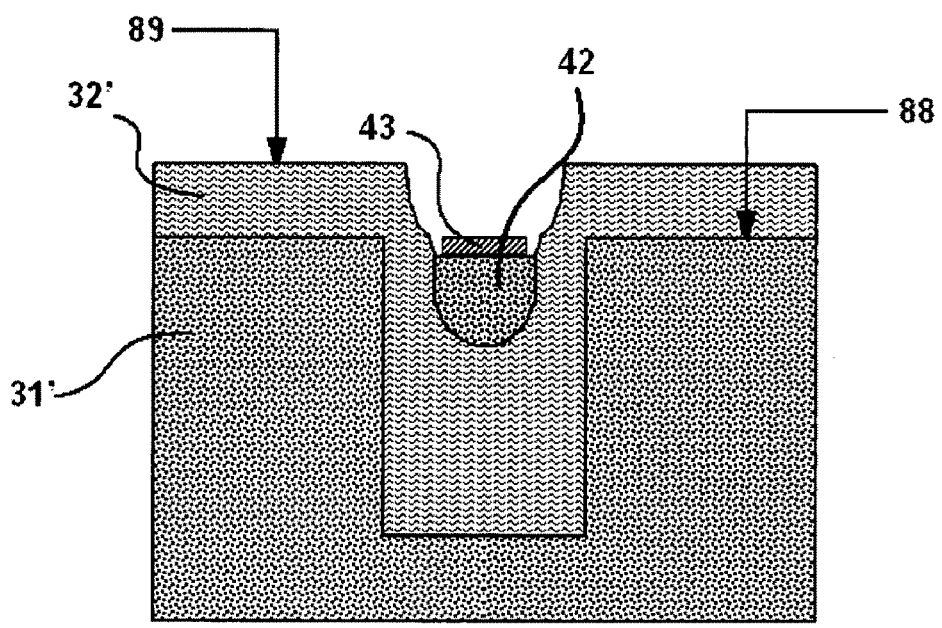
FIG. 15 shows another alternative embodiment of the arrangement shown in FIG. 8.
Figure 16:
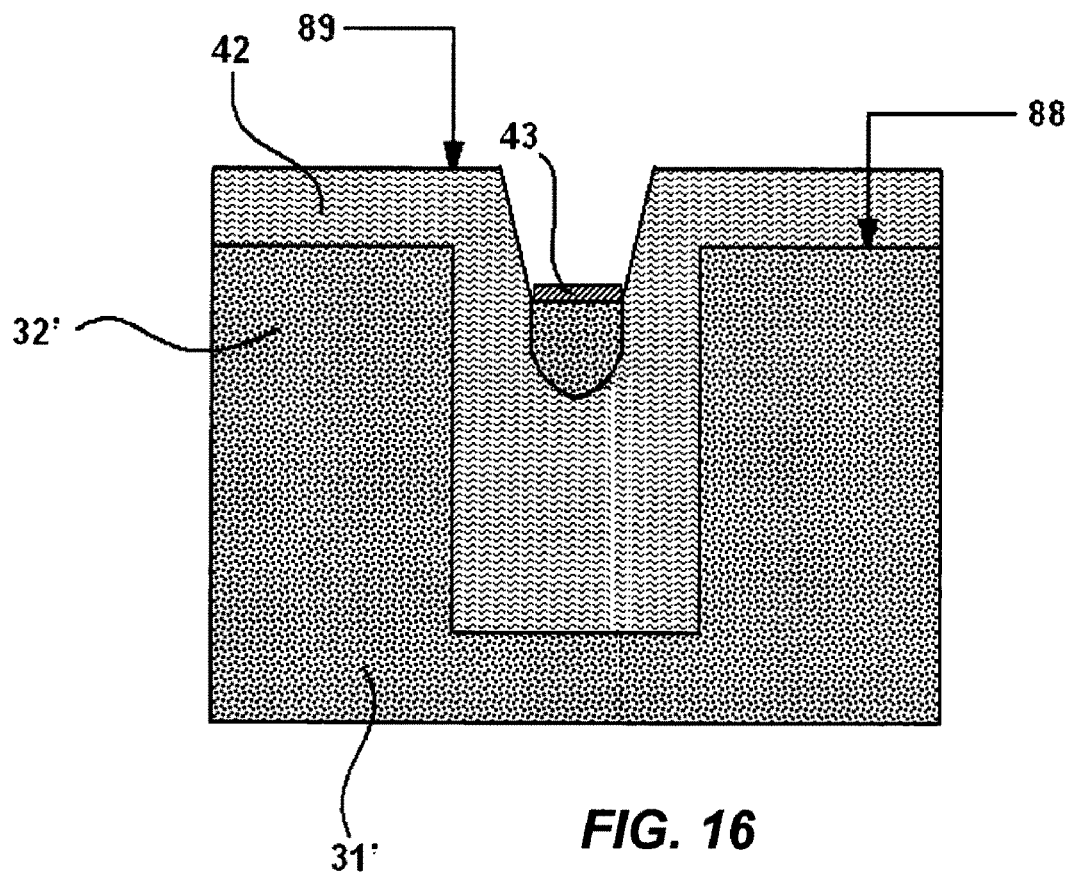
FIG. 16 shows another alternative embodiment of the arrangement shown in FIG. 8.

The invention is not restricted to the type of trench profile showed in FIG. 8, but could present many other profiles. For example, any cross-section that has mirror-type longitudinal symmetry with respect to a straight line that is perpendicular to the plane implicitly defined by the gate plate. This definition includes a trench engraved on the dielectric that presents a squared profile as shown in FIG. 14, where 31' indicates the gate plate, 32' indicates the insulating layer, 42 indicates the metal layer and 43 indicates the low effective-work-function material. FIG. 14 presents a trench engraved on the insulating layer that has its depth larger than its width. This configuration has, as an advantage, the reduction of the electrostatic field at the side that is opposite to the exposed side of cathode, implying a reduced chance of dielectric breakdown. The set of FIGS. 14-16 show other possible embodiments which also follow the spirit of current invention. FIG. 14 shows a configuration where the top surface of the low-effective-work-function material 43 is positioned above the level of the opening 88 of the trench engraved on the gate plate 31'. FIG. 15 shows a configuration where this top surface of the low-effective-work-function material 43 is at the same level 88 of the opening of the trench, while FIG. 16 shows a configuration where the top surface of the low-effective-work-function material 43 is below the level 88 of the opening of the trench. This relative position allows control of the focusing of the emitted electrons, where this focusing increases from FIG. 14 to FIG. 16, while the gate voltage decreases.

Thus, in accordance with certain embodiments, a field emitter device has a substantially planar insulating plate, constituting a self-standing substrate. A plurality of trenches are formed on a surface of the insulating plate, the trenches presenting a mirror type longitudinal symmetry along a plane that is perpendicular to the insulating plate. A first conducting layer overlays a surface of the insulating plate that contains the trenches and conforms with the surface, forming at least one gate electrode. A dielectric layer is juxtaposed to the first conducting layer and in conformation with the conducting layer, forming trenches that present mirror type longitudinal symmetry along a plane that coincides to the symmetry plane of the trenches present in the insulating plate. A plurality of cathode stripes are formed within the trenches formed on the dielectric layer, a width and a height of a cross-section of the cathodes having an aspect ratio that is less that approximately 10. A crest portion of the cathodes faces away from the gate electrode being at least partially overlaid with a strip of low effective-work-function material. At least one conductive anode is positioned in a parallel relation to the insulating plate, where the electrons are collected, the anode having its width approximately equal to or larger than the width of the cathode stripes.

Figure 17:
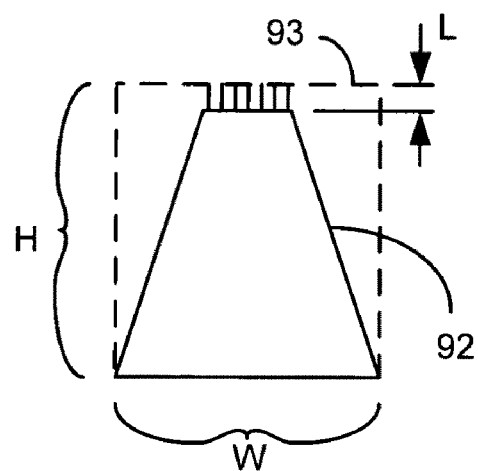
FIG. 17 shows an example of the use of the term "aspect ratio" in connection with a trapezoidal shaped cathode.

FIG. 17 shows an example of the use of the term "aspect ratio" in connection with a trapezoidal shaped cathode. In this example, the aspect ratio of the trapezoidal shaped cathode 92 is determined by the rectangle 93 that encloses the cathode. The aspect ratio is given by W/H. In this example, carbon nanotube emitters are shown greatly exaggerated in proportion as having length L. The aspect ratio is essentially the same whether the length L is included in H or not, since the length L of the nanotubes is much smaller than the height ~H of the of the trapezoid 92.

Figure 18:
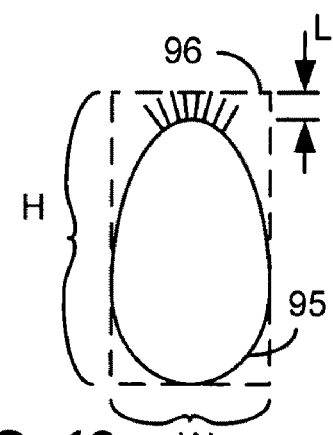
FIG. 18 shows an example of the use of the term "aspect ratio" in connection with an exemplary egg-shaped cathode.

FIG. 18 shows an example of the use of the term "aspect ratio" in connection with an egg shaped cathode. In this example, the aspect ratio of the egg-shaped cathode 95 is again determined by the rectangle 96 that encloses the cathode. The aspect ratio is given by W/H. In this example too, carbon nanotube emitters are shown greatly exaggerated in proportion as having length L. Again, the aspect ratio is essentially the same whether the length L is included in H or not, since the length L of the nanotubes is much smaller than the height ~H of the egg-shaped cathode 95.

While the preceding examples show cathodes having their upper surfaces overlaid with nanotubes, it should be understood that these are exemplary embodiments of the invention, which can also encompass any low effective-work-function material. In accordance with certain embodiments consistent with the present invention, an effective-work-function contrast is provided along the perimeter of the cathode cross-sections. As shown in the preceding figures, many of the embodiments shown guarantee that the portion of the cathodes which face away from the gate have a substantially lower effective-work-function than the remainder of the surface, while other embodiments guarantee that the surface that is closer to the gate is in contact with the dielectric layer, avoiding any emission at all. Consequently, notwithstanding the fact that the electric field is stronger in the portion of the cathodes facing toward the gate, electron emission occurs from the crest of the cathodes, due to the above mentioned effective-work-function contrast or presence of the insulating layer.

The efficiency of this electron emission process is dependent upon the cathode dimensions, preferably of the order of a few micrometers, as well as the dielectric layer thickness. Small cathode cross-section reduces the gate-cathode capacitance resulting in an improved high-frequency response of the device, which is desirable for certain applications. Moreover, electron emission can be achieved with a lower gate voltage than in other arrangements, resulting in less electrons being attracted backwards toward the gate and therefore less charging of the dielectric, while the focusing of the electron beam can be greatly improved.

TABLE 1 below depicts field strength (V/µm) above a crest of a cathode at 50V applied to a back gate and 1V/µm macroscopic field created by an anode. The gate-cathode distance is 0.5 µm, the dielectric constant of the dielectric between the gate and cathode lines is 4; inter-cathode lines distance is equal 1.5 width of lines; lines height is 0.5 µm. The trapezoidal profile has 80 degrees angles between the trapezium basis and the sides; L is the length of the bottom (largest) side of the trapezium or a diameter of a semicircular profile, correspondingly.

TABLE 1

| L, µm/cathode profile | Field strength (V/µm) |
|---|---|
| 0.8/semicircle | 44 |
| 0.8/trapezium | 13 |
| 2.2/trapezium | 11.4 |
| 3.2/trapezium | 8.5 |

From TABLE 1 it is clear that a semicircular profile provides much higher local fields at the crest in comparison with trapezoidal profile. Among trapezoidal profiles (which is practical and readily manufacturable profile) the profile with smaller aspect ratio has higher local field above the crest, thus resulting in better field emission (lower voltage at the gate will be required to initiate emission from an emitting structure placed at the crest; similar, maximum currents can be achieved at lower gate voltage).

Figure 19:
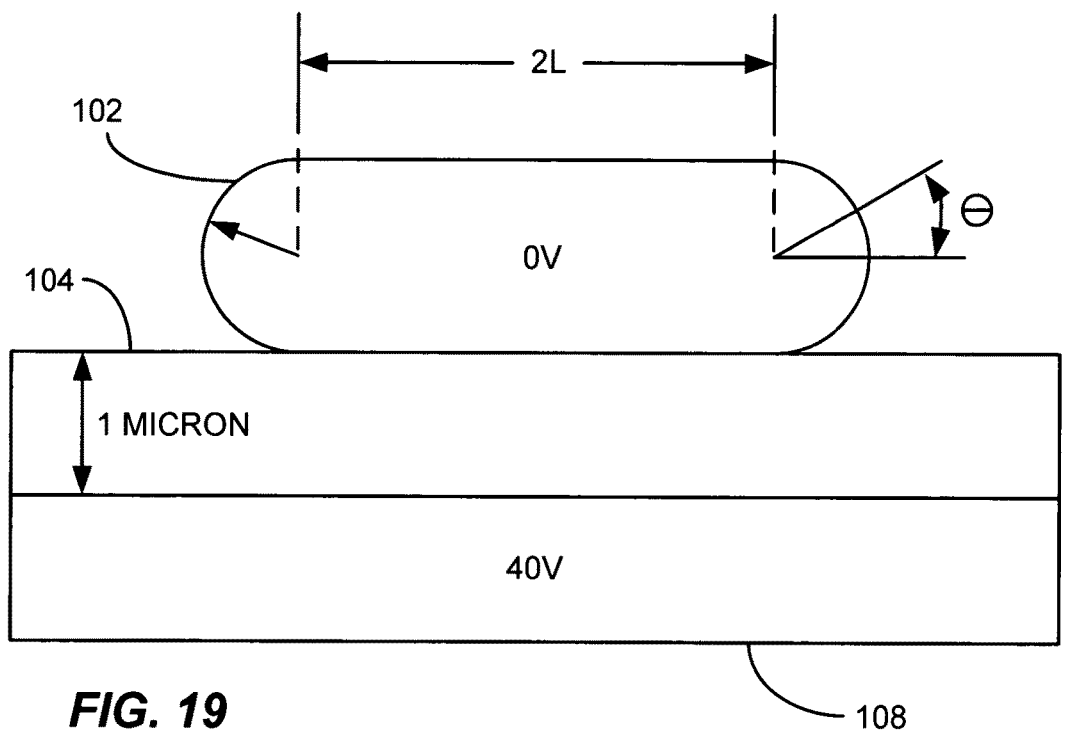
FIG. 19 shows a simulation setup used to determine a location for placing emitter structures on the crest of a cathode having a rectangular cross-section with rounded corners.
Figure 20:
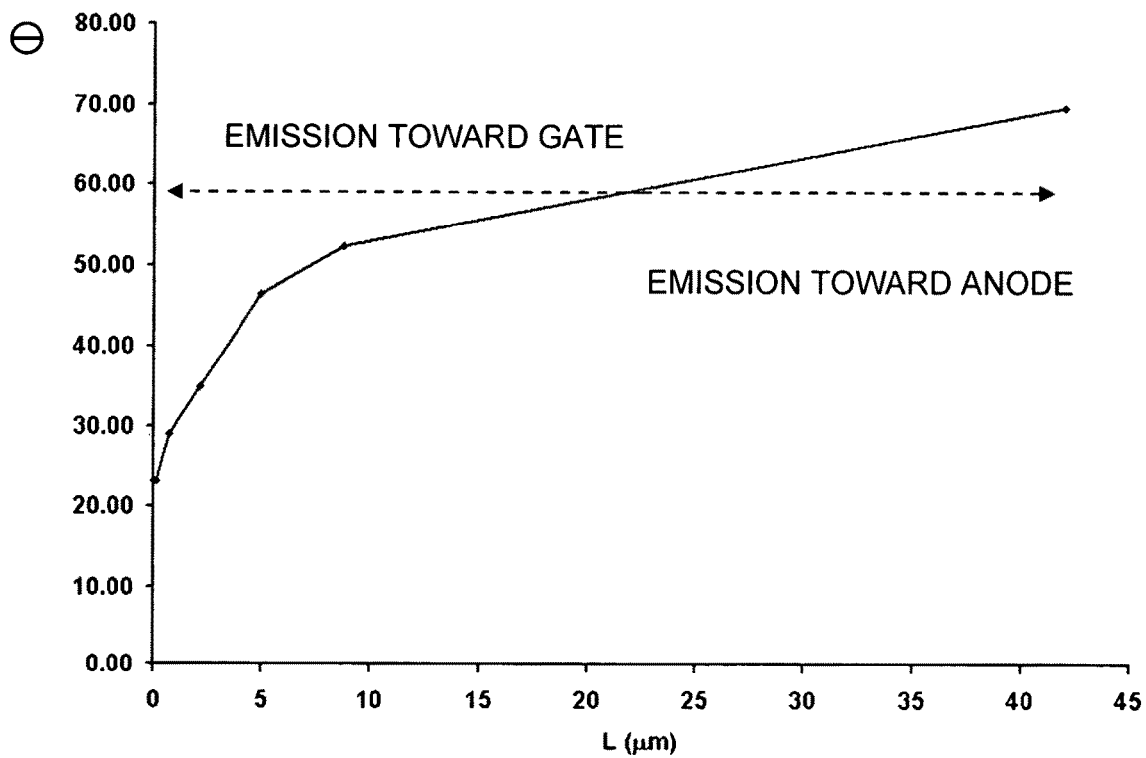
FIG. 20 shows a graph of angle versus length of the cathode.

Referring now to FIG. 19, a simulation setup is shown in which a 0.5 µm thick rectangular cathode 102 having rounded edges is shown in cross-section atop a 1 micron thick silicon dioxide insulator 104. Insulator 104 is deposited upon an anode or gate structure 108 for the simulation. The gate is simulated at 40V of bias with respect to the cathode. The objective of this simulation is to determine where the emitting structures can be placed in order to avoid emission toward the gate, thus defining an appropriate "crest" for this particular geometry under this set of test conditions. This simulation is based upon calculated electron trajectories for the rounded edge of the cathode structure. By defining an angle θ, the minimum value of the angle can be determined such that the electrons are theoretically entirely emitted toward the anode and not back toward the gate. FIG. 20 shows the results of this simulation for varying values of L and angle θ. As can be seen from the graph, the angle θ can be smaller as the length L is decreased without causing emissions toward the gate. This demonstrates the significance of the smaller cathode aspect ratio than that which has been previously used. For example, if the length of the cathode is 10 and the height is 0.5 µm, the angle θ is approximately 50° compared to about 22° for an aspect ratio of 1.0. Thus, at an aspect ratio of 1.0, any angle greater than about 22° will assure that virtually all electrons will be emitted toward the anode. Of course, those skilled in the art will appreciate that other geometries used under different circumstances will exhibit different results.

The performance of the suggested cathode geometries in ensuring essential emission of electrons from emitting structure toward anode, rather than to a back gate, was demonstrated by theoretical calculations of electron trajectories in a paper by Mammana et al. (APPLIED PHYSICS LETTERS 85 (5): 834-836 Aug. 2 2004). When a cathode was represented by a cylinder, the electrons do not reach the gate if the emission sites are within a range of angle Θ between −45° and +45°, even if no anode field is present. Angle Θ in this context restricts an arc on a cylinder surface where emitting material can be placed. If a cathode has a rectangular profile, all electrons emitted from the cathode edge reach the gate in the absence of an anode field. In another paper by Mammana et al. (JOURNAL OF VACUUM SCIENCE & TECHNOLOGY A 22 (4): 1455-1460 July-August 2004), field distribution along a surface of cathodes with different profiles (circular and rectangular with different aspect ratios) had been calculated and regions for placement of the emitting structures were defined.

Thus, in accordance with certain embodiments consistent with the present invention, an electron emitter assembly arrangement can be provided in which there is a more efficient use of the available cathode area. In certain embodiments, gate current can be avoided. In certain embodiments, the manufacturing process can be simplified by reducing the number of processing steps. In certain embodiments, outgassing problems can be avoided due to the use of organic insulators. In certain embodiments, the capacitance between the gates and the cathodes can also be reduced, as well as avoiding the relative process complexity usually associated with the deposition of inorganic insulators. Certain embodiments provide an electric field that is symmetric with respect to a vertical plane running along the central axis of the cathode. Certain embodiments may provide an emitter assembly arrangement in which triode-mode electron emission takes place at lower bias voltage than in the current arrangements, while the ratio of electrons reaching the anode with respect to the number of electrons reaching the dielectric is reduced. In yet other embodiments, dielectric charging can be decreased.

These improvements can be achieved in accordance with certain embodiments in which an emitter assembly arrangement has at least one gate electrode, a plurality of substantially prismatic conducting cathodes placed in a parallel relation with the gate electrode and isolated from the latter by a dielectric layer, the cathodes having an aspect ratio close to one and different effective-work-function properties on the portion facing the gate and on the portion facing away from the gate, the width and height of the cathodes being comparable, i.e., the aspect ratio of the cathodes cross-section being close to one, the cross-section being substantially uniform along the length of the cathode stripes.

In accordance with certain embodiments consistent with the invention, the dielectric can be a solid dielectric layer, with the cathodes resting atop the surface of the layer. In certain embodiments, the cathodes' cross-section can be substantially trapezoidal in shape. In certain embodiments, the portion of the cathodes facing the gate can be flat. Alternatively, the portions of the cathodes facing toward the gate can be substantially cylindrical in shape. Alternatively, the cathodes can be substantially cylindrical in shape. Alternatively, the cathodes can be inserted in trenches engraved in the dielectric surface. Alternatively, the dielectric surface conformably overlays the gate surface, in a way that its cross-section presents trenches that are similar in shape to ones previously engraved in the gate. Alternatively, the cathodes can be substantially half-round in shape.

According to another feature of certain embodiments, the portion of the cathodes facing away from the gate can be coated with a stripe of low-effective-work-function material. Preferably, the gate electrode is made of a material that presents a stable oxide, such as silicon or aluminum (for example) and the dielectric layer between the cathodes and the gate being provided by the oxidation of the gate material.

Many modifications and other embodiments of the invention will come to the mind of one skilled in the art having the benefit of the teachings presented in the foregoing descriptions and the associated drawings.

One such modification involves not limiting the gate plate material to doped silicon, but employing any material which has a stable oxide, which would be produced on the plate's surface by any known process. For instance, the gate plate may be made of Aluminum, in which case the grown insulating layer would be made of anodized Aluminum oxide.

Furthermore, the invention is not limited to the insulating layer being an oxide of the gate plate material. The insulating layer may be applied by deposition over the gate plate of a different insulating material altogether.

Therefore, it is to be understood that the invention is not to be limited to the specific embodiments disclosed, and that modifications and further embodiments are intended to be included within the scope of the appended claims. While certain illustrative embodiments have been described, it is evident that many alternatives, modifications, permutations and variations will become apparent to those skilled in the art in light of the foregoing description.

What is claimed is:

1. A back gated field emission device comprising:
   a substantially planar conducting material forming a gate electrode;
   an electric insulating layer juxtaposed to said gate electrode;
   a plurality of parallel conductive stripes having length and forming cathodes disposed on and having a base contacting the insulating layer with each of the cathode stripes having a crest at a surface opposite a base contacting the insulating layer, wherein the insulating layer is between said gate and said cathodes;
   at least one conductive anode where the electrons are collected, where the anode is situated on the opposite side of the cathodes contacting the insulating layer and beyond the crest of the cathodes;
   where the arrangement of the gate, the insulating layer, the cathodes and the at least one anode results in a back gated configuration;
   wherein said cathodes are positioned in a substantially parallel relation with said gate electrode, the cathodes each having a cross-section taken normal to said length;
   wherein a cross-sectional width, divided by a cross-sectional height of a rectangle that minimally and fully encloses the cross-section of said cathodes is less than approximately 2, where one edge of the rectangle contacts the crest of the cathode and is parallel to the plane of the gate electrode said cross-section being substantially uniform along the length of the cathode stripes;
   wherein the cathode stripes are substantially prismatic with any number of longitudinal faces joined at edges;
   where at least a portion of the edges are rounded; and
   a strip of low effective work-function material disposed along the crest of the cathodes facing said anode.

2. A field emitter device as claimed in claim 1, wherein at least one of the faces of said prismatic cathode is rounded.

3. A field emitter device as in claim 1, wherein electrical potentials can be applied to the gate, cathodes and anode independently.

4. A field emitter device as in claim 1, wherein further comprising a substantially planar insulating plate constituting a self-standing substrate upon which the field emitter device is fabricated.

5. A field emitter device as in claim 1, wherein the gate electrode is comprised of a conductive plate forming a substrate upon which the field emitter device is fabricated.

6. A field emitter device according to claim 1, wherein the aspect ratio is less than approximately 1.

7. A field emitter device according to claim 1, wherein the cathode/emitter structure has an effective work function of less than approximately 3 eV.

8. A field emitter device according to claim 1, wherein the low effective-work-function material comprises at least one of, MoC, WC, TiC, LaB6, ZrC, NbC, HfC, carbon nanotubes coated with dielectrics, carbon nanotubes, coated carbon nanotubes, boron nitride nanotubes, silicon nanotubes, silicon carbide nanorods, diamond nanorods, carbon nanoflakes, carbon nanosheets, porous interconnected graphene morphologies, porous conducting nanostructures, nanostructured diamond-like carbon; carbon, metal, Au, Ag or Ni nanowires, composites having a polymer matrix with incorporated nanostructures, hybrid structures of carbon nanotubes and nanodiamond or metal particles, doped nanostructures, a coating formed by electrophoretic deposition of nanodiamond particles or a nanodiamond thin film grown by CVD over the cathode crest area, and, thin films of wide band-gap dielectrics.

9. A field emitter device as claimed in claim 1, wherein the electric insulating layer juxtaposed to the gate contains trenches at a surface on the cathode side of the insulating layer.

10. A field emitter device as claimed in claim 9, wherein the cathode stripes have exposed sides that are at approximately a level of a top opening of the trench present on the insulating layer materials.

11. A field emitter device as in claim 9 wherein the cathode stripes have exposed sides that are above the level of a top opening of the trench present on the insulating layer material.

12. A field emitter device as claimed in claim 9, wherein the cathode stripes have exposed sides that are below the level of a top opening of the trench present on the insulating layer material.

13. A field emitter device as claimed in claim 9, wherein said cathode stripes are at least partially formed within said trenches.

14. A field emitter device as claimed in claim 13, wherein the cathode stripes have exposed sides that are at approximately a level of a top opening of the trench present on the gate conductive material.

15. A field emitter device as claimed in claim 13, wherein the cathode stripes have exposed sides that are above the level of a top opening of the trench present on the gate conductive material.

16. A field emitter device as claimed in claim 13, wherein the cathode stripes have exposed sides that are below the level of a top opening of the trench present on the gate conductive material.

17. A field emitter device as claimed in claim 13, wherein the trenches formed on the gate present a width that is smaller than a depth.

18. A field emitter device as claimed in claim 13, wherein the gate comprises a metal and the insulating layer juxtaposed to the trenches comprises a dielectric material.

19. A field emitter device as claimed in claim 13, wherein:
one side of the substantially planar conducting material forming the gate contains trenches, said trenches having a mirror type longitudinal symmetry plane which is perpendicular to the plane defined by the gate;
the electric insulating layer being juxtaposed to the side of the gate where the trenches are present, such that the insulating layer presents trenches which are substantially conformal with the trenches present in the gate; and
the conductive cathode stripes are formed within the trenches formed in the insulating layer, said cathode stripes presenting an exposed side that faces away from the conductive gate.

20. A field emitter device as claimed in claim 13, wherein the conducting material forming the gate with trenches comprises a conductor or a doped semiconductor material which has a stable oxide.

21. A field emitter device as claimed in claim 20, wherein the insulating layer juxtaposed to said conducting material is formed by the oxidation of the gate conducting material, in order to form a conformal insulating and stable oxide layer.

22. A field emitter device as claimed in claim 20, wherein the conducting material forming the gate with trenches comprises one of Aluminum and doped Silicon, and wherein said dielectric layer correspondingly comprises one of Aluminum Oxide and Silicon Oxide.

23. A back gated field emission device for emission of electrons toward an anode, comprising:
a substantially planar conducting material forming a gate electrode;
an electric insulating layer juxtaposed to said gate electrode;
a plurality of parallel conductive stripes having length and forming cathodes disposed on and having a base contacting the insulating layer with each of the cathode stripes having a crest at a surface opposite the base contacting the insulating layer, wherein the insulating layer is between said gate and said cathodes;
at least one conductive anode where the electrons are collected, where the anode is situated on the opposite side of the cathode contacting the insulating layer and beyond the crest of the cathodes;
where the arrangement of the gate, the insulating layer, the cathodes and the at least one anode results in a back gated configuration;
wherein said cathodes are positioned in a substantially parallel relation with said gate electrode, the cathodes each having a cross-section taken normal to said length;
wherein a cross-sectional width, divided by a cross-sectional height of a rectangle that minimally and fully encloses the cross-section of said cathodes is less than approximately 2, where one edge of the rectangle contacts the crest of the cathode and is parallel to the plane of the gate electrode said cross-section being substantially uniform along the length of the cathode stripes;
wherein the cross-section of said cathode stripes are rounded and devoid of sharp edges below the crests of the cathodes;
wherein the electric insulating layer juxtaposed to the gate contains trenches at a surface on the cathode side of the insulating layer with at least a portion of the cathode stripes being formed within said trenches; and
a strip of low effective work-function material disposed along the crest of the cathodes which emit electrons toward said anode, said strip of low effective work-function material having an effective work-function of less than approximately 3 eV.

24. A back gated field emission device comprising:
a substantially planar conducting material forming a gate electrode;
an electric insulating layer juxtaposed to said gate electrode;
a plurality of parallel conductive stripes having length and forming cathodes disposed on and having a base contacting the insulating layer with each of the cathode stripes having a crest at a surface opposite the base contacting the insulating layer, wherein the insulating layer is between said gate and said cathodes;
at least one conductive anode where the electrons are collected, where the anode is situated on the opposite side of the cathodes contacting the insulating layer and beyond the crest of the cathodes;
where the arrangement of the gate, the insulating layer, the cathodes and the at least one anode results in a back gated configuration;
wherein said cathodes are positioned in a substantially parallel relation with said gate electrode, the cathodes each having a cross-section taken normal to said length;
wherein a cross-sectional width, divided by a cross-sectional height of a rectangle that minimally and fully encloses the cross-section of said cathodes is less than approximately 2, where one edge of the rectangle contacts the crest of the cathode and is parallel to the plane of the gate electrode said cross-section being substantially uniform along the length of the cathode stripes;
where the cathodes exhibit an absence of any sharp corner below the crests of the cathodes; and
a strip of low effective work-function material disposed along the crest of the cathodes facing said anode.

* * * * *